Patented Mar. 28, 1944

2,345,485

UNITED STATES PATENT OFFICE 2,345,485

DYESTUFF SALTS

Hans Krzikalla, Otto Dornheim, and Helmut Pfitzner, Ludwigshafen-on-the-Rhine, Germany, assignors to General Aniline & Film Corporation, New York, N. Y., a corporation of Delaware No Drawing. Application January 26, 1940, Serial No. 315,776. In Germany February 10, 1939

8 Claims. (Cl. 260—438)

The present invention relates to salts of azomethine compounds, especially to salts of complex heavy metal compounds of azomethine compounds containing an acid group, with organic nitrogen bases.

We have found that valuable dyestuff salts which are easily soluble in organic agents are obtained by reacting complex heavy metal compounds of azomethine compounds containing in ortho-position to the carbon atom and in ortho-position to the nitrogen atom of the azomethine bridge a radical capable of forming complexes with heavy metals having an atomic weight of from 48 to 66 and containing at least one sulfonic acid or carboxylic acid group, with organic nitrogen bases containing at least 5 carbon atoms.

Complex heavy metal compounds of the azomethine series suitable as starting materials for the preparation of the salts mentioned above may be prepared for instance by the processes described in British Patents 493,501 and 493,314. The azomethine compounds contain the grouping

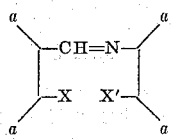

wherein X and X' stand for a group capable of forming complexes with heavy metals, such as titanium, vanadium, chromium, manganese, iron, nickel, cobalt and zinc and the linkages marked $a$ are parts of a six-membered ring. Groups capable of forming complexes with the said metals are, for example, —OH, —O—alkyl, —SH, —S—alkyl, —NH₂, —COOH or —OCH₂—COOH; the starting materials are so chosen that at least one of the said groups is a hydroxy group. The complex chromium azomethine compound, where X and X' stand for a hydroxy group probably has the following grouping

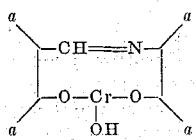

wherein the linkages marked $a$ are parts of a six-membered ring.

Among the suitable organic nitrogen bases, which may be employed as such or in form of their salts with mineral acids of low molecular fatty acids, there may be mentioned by way of example: primary, secondary and tertiary aliphatic amines, such as amylamine, dodecylamine, octodecylamine, dimethyloctodecylamine, diethyloctodecenylamine, dimethyl palm kernel oil amine (which may be prepared from the acids obtainable by saponifying palm kernel oil and reducing these acids in the presence of dimethylamine), diisoamylamine and isopentadecylamine, cycloaliphatic amines, such as cyclohexylamine and dicyclohexylamine, aralkylamines, aromatic amines, such as anilines, naphthylamines and diarylguanidines, and heterocyclic amines, such as quinolines, carbazoles and hydrogenated carbazoles. Furthermore the so-called basic dyestuffs containing a colored cation are suitable as organic nitrogen bases for this purpose. Dyestuffs of this kind are, for instance, Night Blue (Colour Index 1934, No. 731), Malachite Green (ibid. No. 657), Auramine O (ibid. No. 655), Trypaflavine (ibid. No. 790), Methylene Blue (ibid. No. 922), Rhodamine B (ibid. No. 749) or Rhodamine 3 B (ibid. No. 751).

The reaction may be carried out by dissolving the complex metal compound of an azomethine dyestuff which contains at least one sulfonic acid or carboxylic acid group in its molecule, in water, if desired in the presence of an alkali, such as ammonia, and then adding the aqueous solution of a salt of an organic nitrogen base with a mineral acid or lower fatty acid, the water insoluble dyestuff salt thus being precipitated out. Another procedure for preparing the dyestuff salts consists in reacting the non-neutralized complex metal compound of the azomethine dyestuff having an acid group, with the nitrogen base in an organic solvent and recovering the dyestuff salt formed, which is readily soluble therein, by suitable methods, for example, by distilling off the organic solvent. In many cases it is advantageous to carry out the preparation of the said azomethine dyestuff and the reaction with the organic nitrogen base in one operation e. g. by adding an organic nitrogen base or its salt to the aqueous solution of a complex metal compound of an azomethine dyestuff as obtained by preparing that dyestuff.

The dyestuff salts thus obtained are very well soluble in organic agents, especially in alcohols, ethers, esters, acetone and chloroform and the colored solutions are distinguished by their unexpected high fastness to light. By reason of the good solubility of the dyestuff salts in organic agents which is for the most part superior to that of the corresponding salts of dyestuffs having a similar constitution and of their other good properties, they are eminently suitable for coloring resins, lacquers, and plastics of any kind.

The following examples will further illustrate how the present invention may be carried out in practice, but the invention is not restricted to these examples. The parts are by weight.

Example 1

5 parts of the complex chromium compound of the azomethine dyestuff obtainable from 4-nitro-2-aminophenol-6-sulfonic acid and ortho-hydroxy-benzaldehyde according to Example 1 of British Patent 493,314, are dissolved in 100 parts of warm water while adding some ammonia and an aqueous solution of dicyclohexylamine acetate is allowed to flow into the solution until the precipitate formed no longer increases. After cooling the resulting precipitate is filtered off by suction and dried. The dyestuff salt thus obtained in a good yield dissolves very well in alcohols and esters giving a yellow color. The solutions are distinguished by a very good fastness to light.

A dyestuff salt of still better solubility is obtained by using ditolylguanidine instead of dicyclohexylamine.

In the same way the corresponding azomethine dyestuffs having zinc or vanadium in complex combination may also be converted into dicyclohexylamine or ditolylguanidine salts which are also readily soluble in organic solvents.

Example 2

An aqueous solution of diphenylguanidine formate is added to an aqueous solution of 10 parts of the complex chromium compound of the azomethine dyestuff prepared according to Example 1 of British Patent 493,314, until the precipitate formed no longer increases. The dyestuff salt separated out is then filtered off by suction, washed with water and dried. It dissolves very readily in nitrocellulose lacquers containing ethylene glycol monoethyl ether as solvent giving a greenish yellow color.

If the complex chromium compound of the azomethine dyestuff obtained from 2-hydroxy-3.5-dichlorbenzaldehyde and 4-sulfoanthranilic acid be used instead of the dyestuff referred to above a dyestuff salt is obtained which also dissolves very readily in nitrocellulose lacquers giving a reddish yellow color.

Example 3

An aqueous solution of palm kernel oil dimethylamine acetate (prepared by saponifying palm kernel oil and reducing the acids thus formed in the presence of dimethylamine and reacting the tertiary amine obtained with acetic acid) is allowed to flow into an aqueous solution of the complex chromium compound of the azomethine dyestuff prepared according to Example 4 of British Patent 493,314 from 2-hydroxybenzaldehyde-5-sulfonic acid and 3,3'-dihydroxy-4,4'-diaminodiphenyl until the resulting precipitate no longer increases. By working up the precipitate in the usual manner a dyestuff salt is obtained which dissolves very readily in nitrocellulose lacquers containing butyl acetate giving a brown color.

Example 4

An aqueous solution of Rhodamine 3 B (Colour Index, 1924, No. 751) is added to an aqueous solution of 10 parts of the chromium complex compound of the azomethine dyestuff employed in Example 1, until the resulting precipitate no longer increases. The dyestuff salt thus obtained is filtered off by suction, washed with water and dried. It dissolves in nitrocellulose lacquers containing ethylene glycol monoethyl ether and butyl acetate as solvents giving a solution having a brilliant red color and a good fastness to light.

Instead of Rhodamine 3 B, which is an ethyl-ester, other esters of Rhodamine with higher molecular weight alcohols, as for example hexyl-alcohol, fat alcohols or benzyl alcohol, may also be employed. The salts obtained with these compounds usually are even more soluble in organic solvents than those produced with Rhodamine 3 B. An especially soluble dyestuff salt, giving a yellowish red color, is obtained when using Rhodamine 6 B (Schultz, Farbstofftabellen, 7th edition, 1931, No. 866) instead of Rhodamine 3 B.

Example 5

An aqueous solution of Auramine O (Colour Index 1924, No. 655) is added to an aqueous solution of the complex chromium compound of the azomethine dyestuff employed in Example 1, until the amount of the resulting precipitate no longer increases. By working up the precipitate in the usual manner a dyestuff salt is obtained which dissolves very readily in nitrocellulose lacquers giving a brilliant greenish yellow color.

Example 6

A solution of 530 parts of isopentadecylamine (having a molecular weight of 270) in a mixture of 165 parts of acetic acid and 2000 parts of water is allowed to flow into a solution of 920 parts of the azomethine dyestuff employed in Example 1 in 12000 parts of water to which 100 parts of a 35 per cent aqueous caustic soda solution has been added, at a temperature of about 60° C. while stirring. The yellow dyestuff salt precipitated is filtered off by suction, washed with water and dried at 60° C. 1425 parts of a dyestuff powder are thus obtained which is easily soluble in nitrocellulose lacquers giving a yellow color.

Example 7

720 parts of the complex chromium compound of the azomethine dyestuff from 3.5-dichlor-2-hydroxybenzaldehyde and 4-nitro-2-aminophenol-6-sulphonic acid are dissolved in a mixture of 146 parts of a 35 per cent aqueous solution of sodium hydroxide and 12,000 parts of water and a solution of 354 parts of isopentadecylamine (having a molecular weight of 270) in a mixture of 90 parts of acetic acid and 2000 parts of water is slowly added while stirring. The dyestuff salt precipitated is then filtered off by suction, washed with water and dried under reduced pressure at 60° C. The dyestuff salt thus obtained in a yield of 1050 parts dissolves very readily in nitrocellulose lacquers giving a reddish yellow color.

Example 8

By causing the complex cobalt compound of the azomethine dyestuff prepared from 2-hydroxybenzaldehyde-5-sulphonic acid and 4.6-dinitro-2-aminophenol to react with dodecahydrocarbazole a yellow-brown dyestuff salt is obtained which dissolves in organic agents giving a yellow-brown color.

Instead of the complex cobalt compound of the said azomethine dyestuff the corresponding iron or nickel or copper compound may be used and instead of dodecahydrocarbazole, isohexylamine may also be employed. All these dyestuff salts thus obtained are readily soluble in organic agents.

Example 9

An aqueous solution of 4-dodecylaniline hydrochloride is allowed to drop into an aqueous solution of the sodium salt of the complex manganese compound of the azomethine dyestuff prepared from 1-hydroxynaphthalene-2-aldehyde-sulphonic acid and 5-nitro-2-aminophenol until the amount of the resulting precipitate no longer increases. The deposited dark-brown dyestuff salt is worked up in the usual manner and dried. It dissolves readily in nitrocellulose lacquers giving a brown color.

Example 10

An aqueous solution of 11 parts of benzylamine is allowed to drop into an aqueous solution of the sodium salt of the complex copper compound of the azomethine dyestuff prepared from 31.7 parts of 4-nitro-2-aminophenol-6-sulphonic acid and 14 parts of 2-hydroxybenzaldehyde and 14 parts of copper acetate, at room temperature while stirring. The deposited greenish-yellow dyestuff salt is worked up in the usual manner and dried. It dissolves readily in nitrocellulose lacquers giving a brown color.

If instead of the complex copper compound of the said azomethine compound the corresponding complex vanadium compound is employed, there is obtained a lemon-colored dyestuff salt which readily dissolves in nitrocellulose lacquers giving a lemon-colored solution.

Example 11

An aqueous solution of 2-naphthylamine acetate is allowed to drop into an aqueous solution of the complex titanium compound of the azomethine compound prepared from 14 parts of 4-nitro-2-aminophenol-6-sulphonic acid, 7 parts of 2-hydroxybenzaldehyde and 20 parts of potassium-titanium-oxalate until a further increase of the deposited precipitate is no longer detectable. The deposited dyestuff salt is filtered off by suction, washed and dried. It readily dissolves in nitrocellulose lacquers giving an orange-brown color.

Example 12

An aqueous solution of the acetic acid salt of diphenylguanidine is allowed to flow into an aqueous solution of one molecular proportion of the sodium salt of the complex chromium compound of the azomethine compound, prepared from 4-nitro-2-aminophenol-6-sulphonic acid and the azodyestuff obtained from 4-nitraniline-2-sulphonic acid and 2-hydroxy-benzaldehyde according to paragraph 1 of Example 6 of British Patent 493,314, until the amount of the precipitate formed no longer increases. After working up the precipitate in the usual manner a dyestuff salt is obtained which readily dissolves in organic solvents, e. g. acetone, giving a brown color.

Example 13

An alcoholic solution of octodecylamine is allowed to drop into an alcoholic suspension of the complex chromium compound of the azomethine compound prepared from 1.2-diaminobenzene and 1-hydroxy-naphthalene-2-aldehyde-5-sulphonic acid until free sulphonic acid is no longer detectable. After distilling off the alcohol there remains an orange colored dyestuff salt which readily dissolves in organic solvents giving an orange color.

If the complex chromium compound of the azomethine compound prepared from 2-aminothiophenol and 1-hydroxy-naphthalene-2-aldehyde-5-sulphonic acid is reacted with octodecylamine in the manner mentioned above, a dyestuff salt is obtained which readily dissolves in organic solvents giving a yellow-brown color.

Example 14

A mixture of 22.2 parts of 2-aminophenol-4-sulphonic acid, 14 parts of 2-hydroxybenzaldehyde, 27 parts of sodium acetate and 300 parts of water is boiled a short time while stirring and a mixture of 33 parts of ferrous sulfate, 35 parts of sodium acetate and 300 parts of water is slowly added. After boiling the mixture for about 3 hours, it is filtered and an aqueous solution of acetic acid salt of palm kernel oil dimethylamine (prepared by saponifying palm kernel oil, reducing the fatty acids thus obtained in the presence of dimethylamine and reacting the amines thus formed with acetic acid) is allowed to flow into the cold filtrate until the deposited amount of the precipitate no longer increases. After working up the precipitate in the usual manner, a dyestuff salt is obtained which readily dissolves in organic solvents, e. g. acetic acid ethylester, giving a brown color.

A similar dyestuff salt is obtained, by using instead of the complex iron compound of the azomethine compound mentioned above, the corresponding complex nickel compound.

What we claim is:

1. Dyestuffs of the azomethine series easily soluble in organic agents being amine salts of complex heavy metal compounds of azomethine compounds containing in ortho-position to the carbon atom and in ortho-position to the nitrogen atom of the azomethine bridge a radical capable of forming complexes with heavy metals having an atomic weight of from 48 to 66, and selected from the class consisting of —OH, —O—alkyl, —SH, —S—alkyl, —NH2, —COOH and —OCH2—COOH at least one of the said radicals being a hydroxy group, said azomethine compounds having at least one sulfonic acid group, with organic nitrogen bases containing at least 5 carbon atoms.

2. Dyestuffs of the azomethine series easily soluble in organic agents being amine salts of complex chromium compounds of azomethine compounds containing in ortho-position to the carbon atom and in ortho-position to the nitrogen atom of the azomethine bridge a radical capable of forming complexes with chromium, and selected from the class consisting of —OH, —O—alkyl, —SH, —S—alkyl, —NH2, —COOH and —OCH2—COOH, said azomethine compounds having at least one sulphonic acid group, with organic nitrogen bases containing at least 5 carbon atoms.

3. Dyestuffs of the azomethine series easily soluble in organic agents being amine salts of complex heavy metal compounds of azomethine compounds containing in ortho-position to the carbon atom and in ortho-position to the nitrogen atom of the azomethine bridge a hydroxy group, the heavy metals having an atomic weight of from 48 to 66, said azomethine compounds having at least one sulfonic acid group, with organic nitrogen bases containing at least 5 carbon atoms.

4. Dyestuffs of the azomethine series easily soluble in organic agents being amine salts of complex chromium compounds of azomethine compounds containing in ortho-position to the carbon atom and in ortho-position to the nitrogen atom of the azomethine bridge a hydroxy group, said azomethine compounds having at least one sulphonic acid group, with organic nitrogen bases containing at least 5 carbon atoms.

5. Dyestuffs of the azomethine series easily soluble in organic agents being amine salts of complex chromium compounds of azomethine compounds containing in ortho-position to the carbon atom and in ortho-position to the nitrogen atom of the azomethine bridge a hydroxy group, said azomethine dyestuffs having at least one sulphonic acid group, with aliphatic amines containing at least 12 carbon atoms.

6. The amine salt of the complex chromium compound of the azomethine compound of the formula

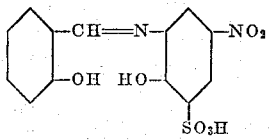

with isopentadecylamine, said salt being easily soluble in organic agents giving a yellow color.

7. The amine salt of the complex chromium compound of the azomethine compound of the formula

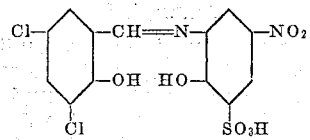

with isopentadecylamine, said salt being easily soluble in organic agents giving a reddish yellow color.

8. The amine salt of the complex chromium compound of the azomethine compound of the formula

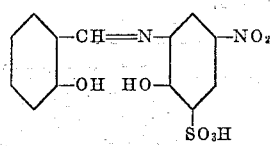

with Rhodamine 3 B (Colour Index 1924, No. 751), said salt being easily soluble in organic agents giving a brilliant red color.

HANS KRZIKALLA.
OTTO DORNHEIM.
HELMUT PFITZNER.